(12) United States Patent
Visser et al.

(10) Patent No.: US 9,794,172 B2
(45) Date of Patent: Oct. 17, 2017

(54) EDGE NETWORK VIRTUALIZATION

(71) Applicant: iPhotonix, Richardson, TX (US)

(72) Inventors: Lance Arnold Visser, Dallas, TX (US); Louis Gregory Fausak, Parker, TX (US); Andrew Kennedy Fullford, Dallas, TX (US); Eric Weeren, Garland, TX (US); Russell Wiant, Carrollton, TX (US); Richard Ballantyne Platt, Prosper, TX (US)

(73) Assignee: iPhotonix, Richardson, TX (US)

( * ) Notice: Subject to any disclaimer, the term of this patent is extended or adjusted under 35 U.S.C. 154(b) by 194 days.

(21) Appl. No.: 14/749,081

(22) Filed: Jun. 24, 2015

(65) Prior Publication Data
US 2015/0381384 A1 Dec. 31, 2015

Related U.S. Application Data

(60) Provisional application No. 62/018,350, filed on Jun. 27, 2014.

(51) Int. Cl.
*H04L 12/713* (2013.01)
*H04L 29/06* (2006.01)
*H04L 12/28* (2006.01)

(52) U.S. Cl.
CPC ........ *H04L 45/586* (2013.01); *H04L 63/0435* (2013.01); *H04L 12/2854* (2013.01); *H04L 63/083* (2013.01)

(58) Field of Classification Search
None
See application file for complete search history.

(56) References Cited

U.S. PATENT DOCUMENTS

| 9,450,817 | B1* | 9/2016 | Bahadur ............. H04L 41/0806 |
| 2002/0097730 | A1 | 7/2002 | Langille et al. |
| 2005/0141518 | A1 | 6/2005 | Schiller et al. |
| 2006/0056297 | A1 | 3/2006 | Bryson et al. |

(Continued)

OTHER PUBLICATIONS

"Wireless LAN Controller (WLC) FAQ", Oct. 8, 2009, http://www.cisco.com/c/en/us/support/docs/wireless/4400-series-wireless-lan-controllers/69561-wlc-faq.pdf.*

(Continued)

*Primary Examiner* — Chi H Pham
*Assistant Examiner* — Vladislav Agureyev
(74) *Attorney, Agent, or Firm* — Slater Matsil, LLP

(57) ABSTRACT

A virtual edge router network for providing managed services to distributed remote office locations can include routing components that are capable of being autonomously deployed at the network edge, as well as remotely managed, thereby obviating the need for on-site technical support in remote offices of the a small and medium business (SMB) client. Autonomous deployment and remote management is achieved through abstraction of the control and management planes from the data plane. Virtual edge routers may include virtual forwarding units and virtual remote agents instantiated on host devices in each remote office location, as well as a virtual network controller instantiated on a host device in a head-office location. A data plane of the virtual edge router communicatively couples the virtual forwarding units to one another, while a control plane communicatively couples the virtual network controller to each virtual data forwarding unit.

22 Claims, 13 Drawing Sheets

(56) References Cited

U.S. PATENT DOCUMENTS

| | | | |
|---|---|---|---|
| 2006/0209830 A1 | 9/2006 | Oguchi et al. | |
| 2007/0064704 A1* | 3/2007 | Balay | H04L 45/00 370/392 |
| 2008/0095054 A1 | 4/2008 | Morford | |
| 2009/0144819 A1 | 6/2009 | Babbar et al. | |
| 2009/0279550 A1 | 11/2009 | Romrell et al. | |
| 2010/0142369 A1 | 6/2010 | Gottwerth et al. | |
| 2010/0284407 A1 | 11/2010 | Leelanivas et al. | |
| 2011/0170865 A1 | 7/2011 | Zheng | |
| 2012/0106559 A1* | 5/2012 | Kim | H04L 63/029 370/401 |
| 2012/0170578 A1 | 7/2012 | Anumala et al. | |
| 2012/0263041 A1 | 10/2012 | Giaretta et al. | |
| 2012/0263183 A1 | 10/2012 | Weill et al. | |
| 2013/0182605 A1* | 7/2013 | So | H04L 45/586 370/254 |
| 2013/0211549 A1* | 8/2013 | Thakkar | G06F 9/45558 700/17 |
| 2013/0305344 A1 | 11/2013 | Alicherry et al. | |
| 2014/0064283 A1* | 3/2014 | Balus | H04L 49/70 370/392 |
| 2014/0133354 A1 | 5/2014 | Scharf et al. | |
| 2014/0351452 A1* | 11/2014 | Bosch | H04L 67/10 709/242 |
| 2015/0023357 A1 | 1/2015 | Imai | |
| 2015/0043350 A1 | 2/2015 | Basilier | |
| 2015/0188943 A1 | 7/2015 | Williams et al. | |
| 2015/0195178 A1* | 7/2015 | Bhattacharya | H04L 45/745 718/1 |
| 2015/0271011 A1* | 9/2015 | Neginhal | H04L 41/0803 370/254 |
| 2015/0326535 A1 | 11/2015 | Rao et al. | |

OTHER PUBLICATIONS

"CPE WAN Management Protocol," TR-069, Issue 1, Amendment 5, CWMP Version 1.4, Broadband Forum, Nov. 2013, 228 pages.

* cited by examiner

EDGE NETWORK VIRTUALIZATION

CROSS-REFERENCE TO RELATED APPLICATIONS

This patent application claims priority to U.S. Provisional Application No. 62/018,350, filed on Jun. 27, 2014 and entitled "Edge Network Virtualization," which is hereby incorporated by reference herein as if reproduced in its entirety.

This patent application is related to U.S. patent application Ser. No. 14/749,163, U.S. patent application Ser. No. 14/749,231, U.S. patent application Ser. No. 14/749,317, and U.S. patent application Ser. No. 14/749,365 each of which are incorporated by reference herein as if reproduced in their entireties.

TECHNICAL FIELD

The present invention relates generally to telecommunications, and in particular embodiments, to techniques and mechanisms for edge network virtualization.

BACKGROUND

Small and medium businesses (SMBs) are becoming increasingly data intensive as industries adapt to the information age. This has created a demand for cost-effective network solutions capable of efficiently delivering services across distributed locations in a secure and reliable manner. Notably, conventional enterprise networks are designed primarily for large corporations, and may be ill-suited for many SMB applications. Specifically, conventional enterprise networks typically require technical support at the network edge in order to deploy and service network equipment in remote office locations. Since many SMB clients do not employ on-site information technology (IT) personnel, the deployment and maintenance of conventional enterprise network equipment in SMB remote offices may require service calls by certified technicians, which may significantly increase the up-front and/or operational expenses of providing conventional enterprise networks to SMB clients. Accordingly, techniques and systems for providing affordable, yet capable, network solutions to SMB clients are desired.

SUMMARY OF THE INVENTION

Technical advantages are generally achieved, by embodiments of this disclosure which describe edge network virtualization.

In accordance with an embodiment, a virtual edge router is provided. In this example, the virtual edge router includes a plurality of virtual data forwarding units, and a data plane communicatively coupling the plurality of virtual data forwarding units with one another. Each virtual forwarding unit is instantiated on a different one of a plurality of host devices, and the data plane includes data tunnels extending between WAN interfaces of the host devices. The virtual edge router further includes a virtual controller instantiated on a central host device, and a control plane communicatively coupling the virtual controller to each of the virtual data forwarding units. The control plane includes control tunnels interconnecting a WAN interface of the central host device to WAN interfaces of the plurality of host devices.

In accordance with another embodiment, a local host device is provided. In this example, the local host device includes a wide area network (WAN) interface, a processor, and a memory adapted to store programming for execution by the processor. The programming including instructions to send a beacon message to a virtual network commander instantiated on a server. The beacon message is configured to establish a management tunnel between the WAN interface of the local host device and the virtual network commander on the server. The management tunnel is adapted to carry signaling over a management plane of a virtual edge router. The programming further includes instructions to trigger establishment of a control tunnel between the WAN interface of the local host device and a WAN interface of a first remote host device. The control tunnel is adapted to carry signaling over a control plane of the virtual edge router. The programming further includes instructions to trigger establishment of a data tunnel adapted to carry signaling over a data plane of the virtual edge router. Each of the data plane, the control plane, and the management plane have a distinct communication plane topology.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
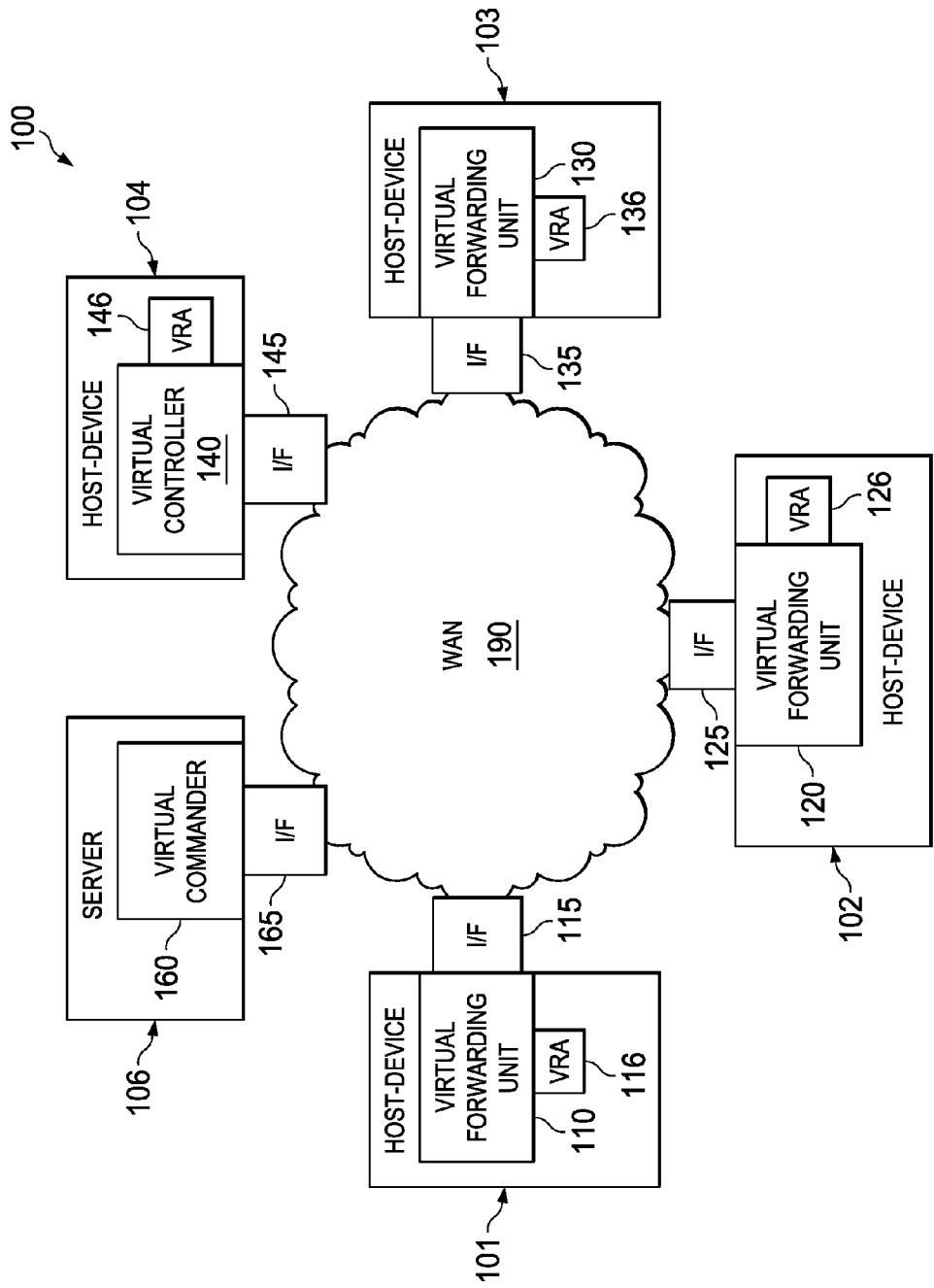
FIGS. 1A-1E illustrate diagrams of an embodiment virtual edge router network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While much of this disclosure discusses virtual networking solutions for SMB clients, those of ordinary skill in the art will recognize that the underlying concepts are scalable to any size system, including (but not limited to) large enterprise networks. Various concepts are disclosed in U.S. Provisional Patent Application 62/018,350, U.S. Provisional Patent Application 62/018,389, U.S. Provisional Patent Application 62/018,398, U.S. Provisional Patent Application 62/018,408, U.S. Provisional Patent Application 62/018,421, U.S. Provisional Patent Application 62/018,433, U.S. Provisional Patent Application 62/018,443 are, each of which are incorporated by reference herein as if reproduced in their entireties.

Disclosed herein is a virtual edge router network for providing managed services to distributed SMB remote office locations. Advantageously, embodiment virtual edge router networks allow distributed host devices to be autonomously deployed at the network edge, as well as remotely managed, thereby obviating the need for on-site technical support in remote offices of the SMB client. Embodiment virtual edge router networks achieve autonomous deployment and remote management capabilities through abstraction of the control and management planes from the data plane. Briefly, an embodiment virtual edge router includes virtual machines instantiated on host devices positioned at remote office locations of an SMB client. The virtual machines include virtual forwarding units and virtual remote agents instantiated on host devices in each remote office location, as well as a virtual network controller instantiated on a host device in a head-office location of the SMB client. The data plane of the virtual edge router communicatively couples the virtual forwarding units to one another and includes data tunnels interconnecting each host device with every other host device in the virtual edge router, thereby providing a direct data path connection between each pair of virtual forwarding units. The control plane communicatively couples the virtual network controller to each virtual data forwarding unit and includes control tunnels interconnecting the host device positioned at the head-office location to host devices positioned at each branch-office location. The management plane interconnects each of the virtual remote agents with a virtual network commander instantiated on a server, which is maintained by a managed service provider (MSP). Embodiment virtual edge router architectures, as well as embodiment techniques for establishing, operating, and modifying said architectures, are described in greater detail below.

FIGS. 1A-1D illustrate a virtual edge router 100 comprising a plurality of virtual data forwarding units 110, 120, 130, a virtual controller 140, and a plurality of virtual remote agents 116, 126, 136, 146. The virtual forwarding units 110, 120, 130, the virtual controller 140, and the virtual remote agents 116, 126, 136, 146 (referred to collectively as "virtual components") may comprise any hardware, software, or combinations thereof within the host devices 101-104. For example, one or more of the virtual components 110-146 may be a virtual machine instantiated on a corresponding one of the host devices 101-104. As another example, one or more of the virtual components 110-146 may be a dedicated hardware component (e.g., application-specific integrated circuits (ASICs), field-programmable gate arrays (FPGAs), etc.) housed by a corresponding one of the host devices 101-104. For purposes of this disclosure, an object "instantiated" on a host device refers to any instance of software and/or hardware installed-on and/or housed-by the host device. The virtual edge router 100 may be managed by a virtual commander 160, which may be instantiated on a server 106. As used herein, the term "server" may refer to any component or collection of components maintained by a managed service provider. For example, the server 106 may correspond to a network of computing devices in a cloud computing data center or in a network of distributed data centers. As shown in FIG. 1A, the host devices 101, 102, 103, 104 and the server 106 comprise wide area network (WAN) interfaces 115, 125, 135, 145, 165 (respectively) configured to communicate over a wide area network 190.

Figure 1B:
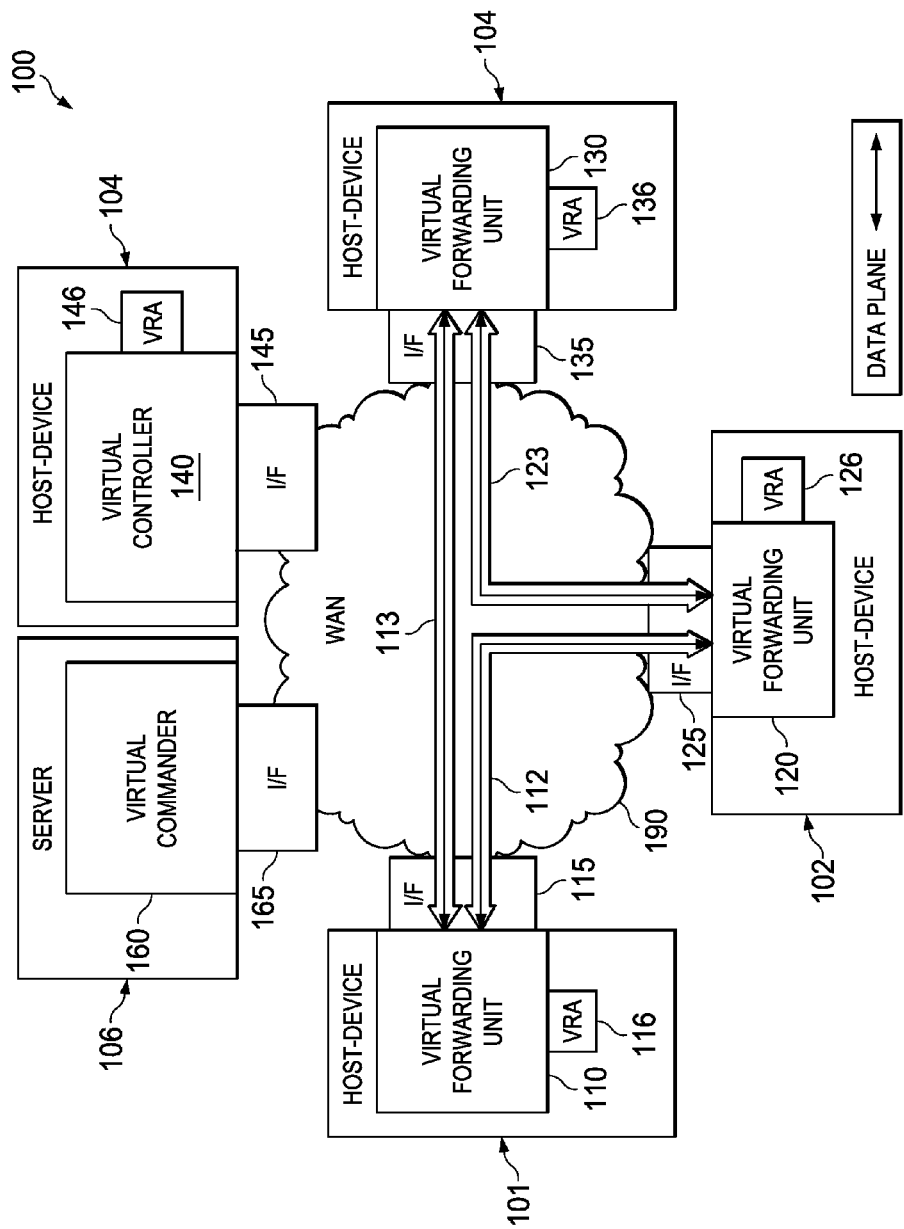

The virtual forwarding units 110-130 are data plane entities of the virtual edge router 100. The terms "virtual forwarding unit," "virtual data forwarding unit," and "virtual forwarding switch" (vFS) are used interchangeably throughout this disclosure. As shown in FIG. 1B, the virtual forwarding units 110, 120, 130 are interconnected to one another via data tunnels 112, 113, 123 extending between WAN interfaces 115, 125, 135 of the host devices 101-103. The data tunnels 112, 113, 123 collectively form a data plane of the virtual edge router 100, and correspond to virtual data pathways through the WAN 190 that are secured by a network tunneling protocol. The virtual forwarding units 110, 120, 130 may be configured to forward data packets over the data tunnels 112, 113, 123. Data packets forwarded over the data tunnels 112, 113, 123 may be transported over the WAN 190 without exiting the data plane of the virtual edge router 100. In embodiments, the virtual forwarding units 110, 120, 130 and/or or the host devices 101-103 may include LAN interfaces for communicating over a local area network with devices (e.g., computers, printers, etc.) in a remote office of an SMB client. The LAN interfaces of the virtual forwarding units 110, 120, 130 and/or or the host devices 101-103 may collectively represent LAN interfaces (or local/private interfaces) of the virtual edge router 100.

Figure 1C:
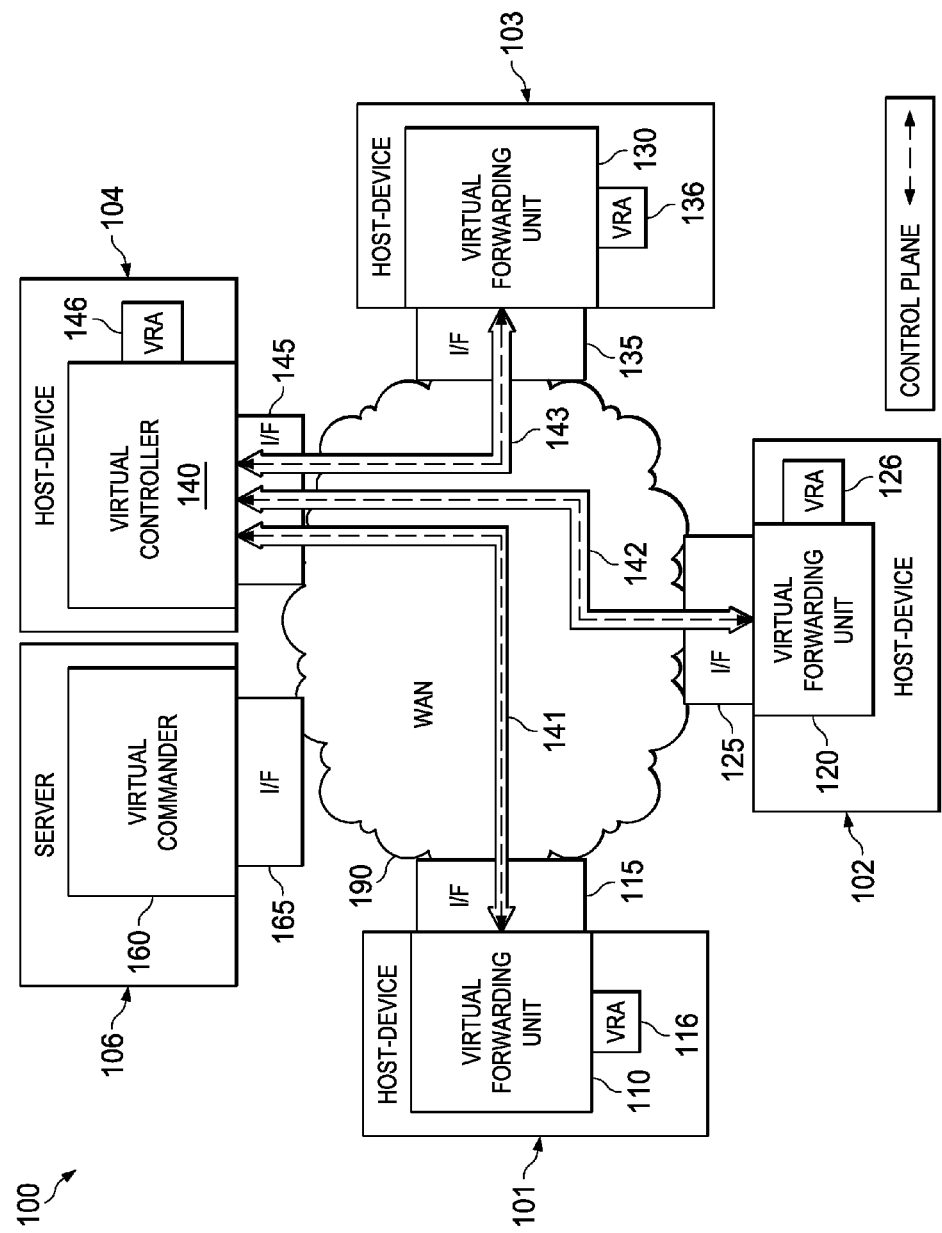

The virtual controller 140 is a control plane entity of the virtual edge router 100. The terms "virtual controller," "virtual network controller," and "virtual flow controller" (vFC) are used interchangeably throughout this disclosure. As shown in FIG. 1C, the virtual controller 140 is connected to each of the virtual forwarding units 110, 120, 130 via control tunnels 141, 142, 143 extending from the WAN interface 145 of the host device 104 to each of the WAN interfaces 115, 125, and 135 of the host devices 101-103. The control tunnels 141, 142, 143 collectively form a control plane of the virtual edge router 100. The virtual controller 140 may be configured to forward control packets over the control tunnels 141, 142, 143. Control packets forwarded over the control tunnels 141, 142, 143 may be transported over the WAN 190 without exiting the control plane of the virtual edge router 100. The virtual controller 140 may update and/or manage tables (e.g., routing, egress, etc.) in the virtual data forwarding units 110, 120, 130 via control signaling communicated over the control tunnel 141, 142, 143.

Figure 1D:
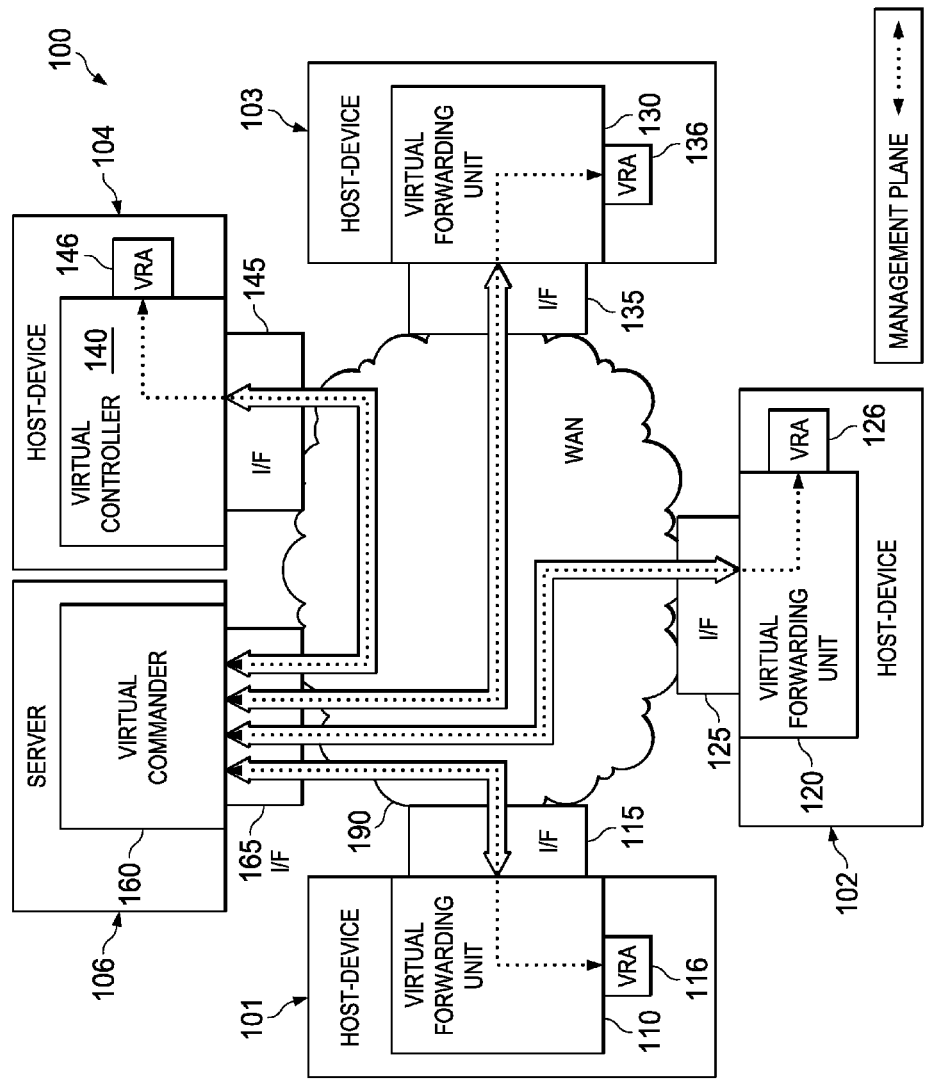

The virtual remote agents 116, 126, 136, 146 are management plane entities of the virtual edge router 100. The terms "remote agent" and "virtual remote agent" (vRA) are used interchangeably throughout this disclosure. The virtual commander 160 may be an internal management plane entity within the virtual edge router 100, or an external management device configured to manage the virtual edge router 100. The terms "virtual commander" and "virtual network commander" (vNetComm) are used interchangeably throughout this disclosure to refer to management applications in a management server. As shown in FIG. 1D, the virtual commander 160 is connected to each of the virtual remote agents 116, 126, 136, 146 via management signaling, which is transported over management tunnels 161, 162, 163 extending from the WAN interface 165 of the server 106 to each of the WAN interfaces 115, 125, 135, 145 of the host devices 101-104. The virtual remote agents 116, 126, 136, 146 and the virtual commander 160 may be configured to forward management packets over the management tunnels 161, 162, 163. Management packets forwarded over the management tunnels 161, 162, 163 may be transported over the WAN 190 without exiting the management plane of the virtual edge router 100.

Figure 1E:
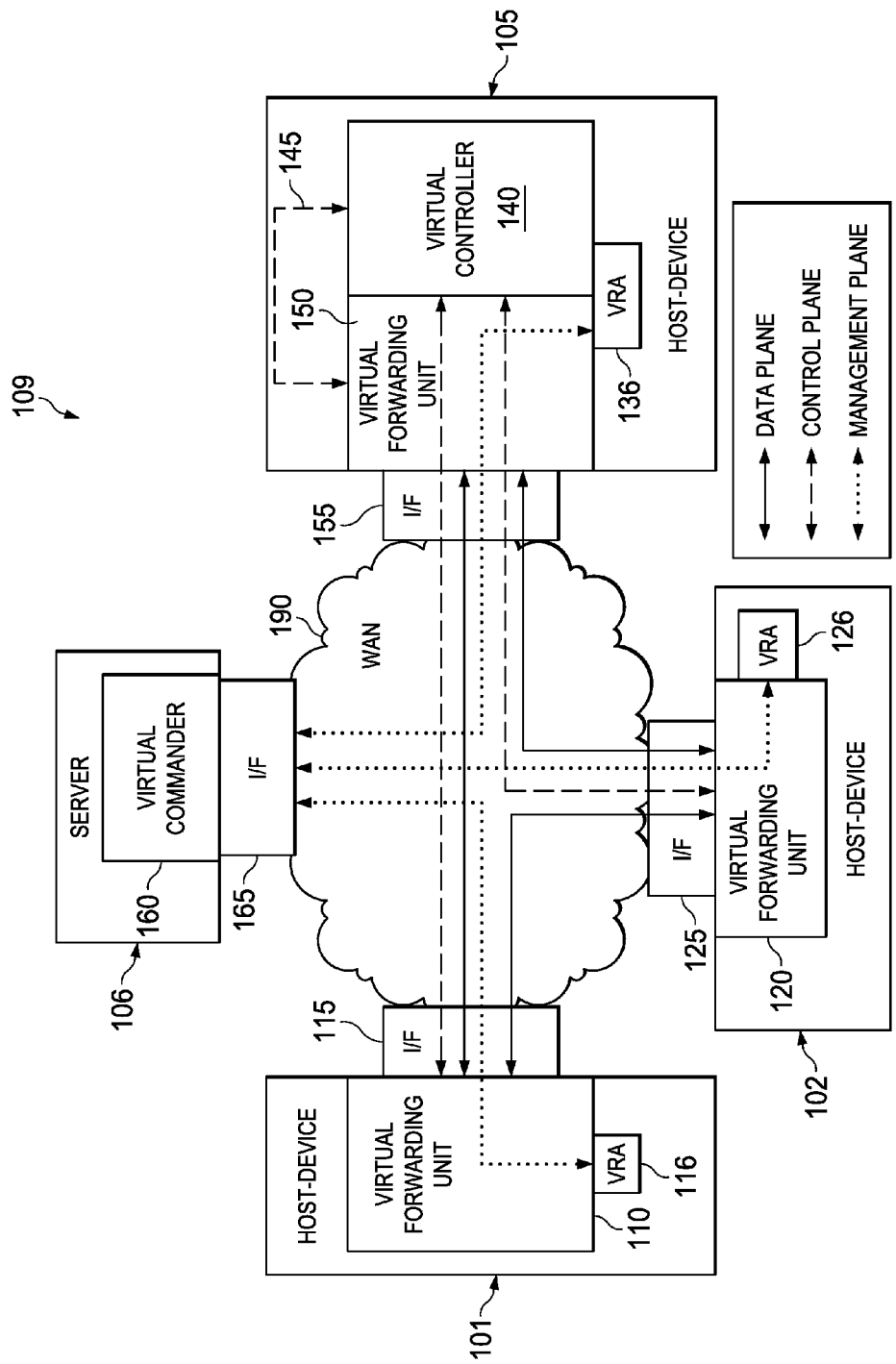

In some embodiments, a virtual controller may be co-located with a virtual forwarding unit in a common host device. FIG. 1E illustrates an embodiment virtual edge router 109 in which the virtual controller 140 and is co-located with a virtual forwarding unit 150 in a host device 105. The host device 105 includes a virtual remote agent 136 configured to manage the virtual controller 140 and the virtual forwarding unit 150. As shown, the virtual controller 140 and the virtual forwarding unit 150 share a common WAN interface 155 of the remote device, and an internal control path 145 extends between the virtual controller 140 and the virtual forwarding unit 150. While the virtual edge router 109 includes data, control, and management tunnels, those tunnels have been omitted from FIG. 1E for purposes of clarity and concision.

The data tunnels 112, 113, 123, control tunnels 141, 142, 143, and management tunnels 161, 162, 163 (referred to collectively as "tunnels") correspond to virtual pathways through the WAN 190 that are secured through one or more network tunneling protocols. In one embodiment, the same tunneling protocol is used for each of the tunnels 112-113, 123, 141-143, 161-163. In another embodiment, different tunneling protocols are used for different tunnel classifications. For example, a different tunneling protocol may be used for the data tunnels 112-113, 123 than for the control tunnels 141-143. In yet other embodiments, different tunneling protocols are used for tunnels within the same tunnel classification. For example, a different tunneling protocol may be used for the data tunnel 112 than for the data tunnel 123. Tunneling protocols may use data encryption to securely transport payloads over the WAN 190. The WAN 190 may include any wide area network or collection of wide area networks. In an embodiment, the WAN 190 corresponds to a public internet. In another embodiment, the WAN 190 corresponds to a private internet protocol (IP) network. In yet other embodiments, the WAN 190 includes a collection of public and private IP networks. The WAN 190 is not limited to IP networks, and may include networks operating under any other network delivery protocol. Unless otherwise specified, the term "wide area network" is used loosely throughout this disclosure to refer to any network (or collection of networks) that serve to interconnect two or more local area networks (LANs).

Figure 2:
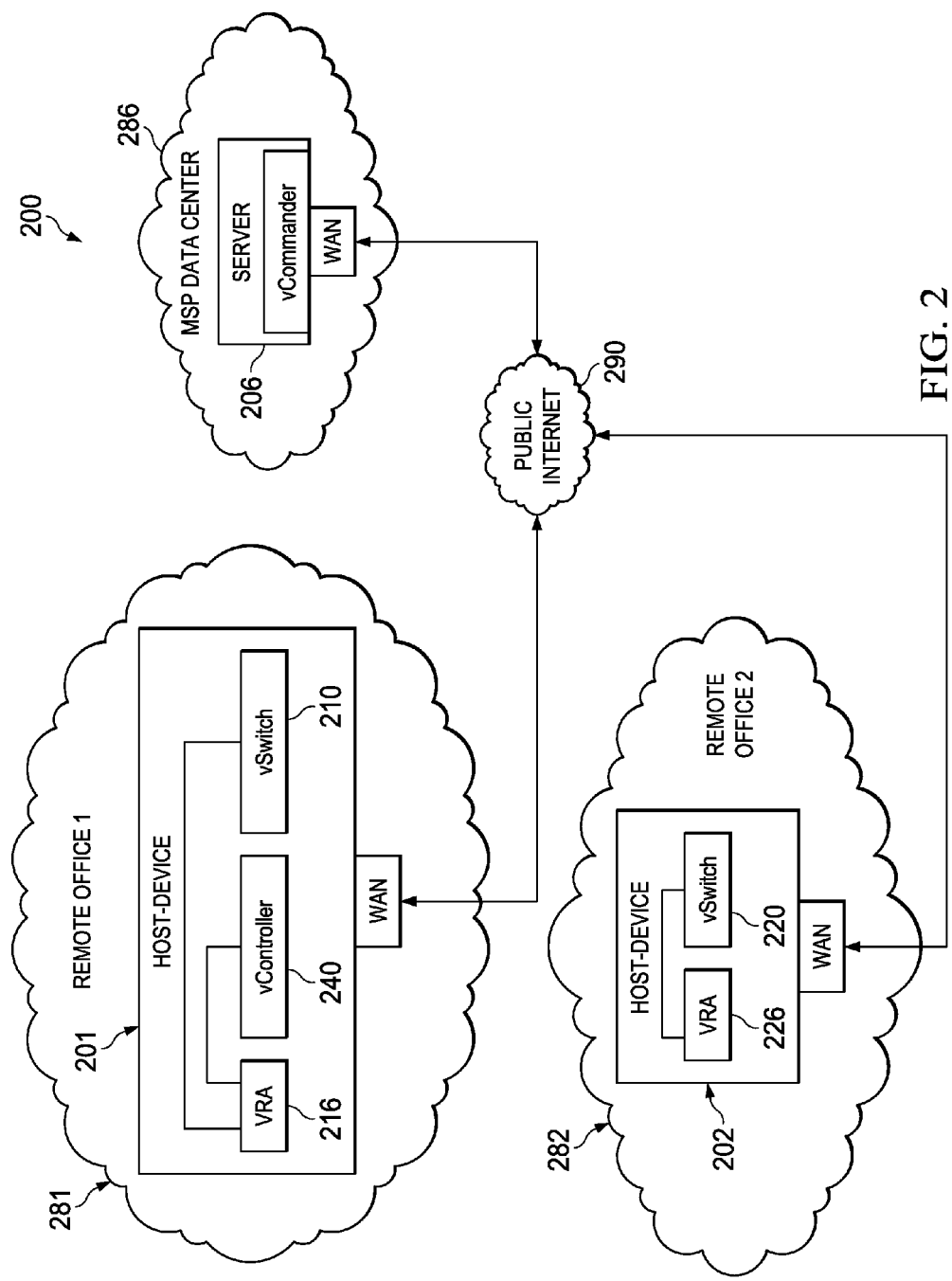
FIG. 2 illustrates a diagram of another embodiment virtual edge router networks.

In some embodiments, a virtual commander may be positioned in a management facility (or network of facilities) maintained by a managed service provider (MSP), while virtual components (e.g., virtual forwarding units, virtual controller, virtual remote agent, etc.) may be instantiated on host devices distributed across multiple remote office locations of an SMB client. FIG. 2 illustrates a virtual edge router 200 comprising a virtual data forwarding unit 210, a virtual remote agent 216, and a virtual controller 240 instantiated on a host-device 201 in a remote office 281, and a virtual data forwarding unit 220 and a virtual remote agent 226 instantiated on a host-device 202 in a remote office 282. The remote offices 281, 282 are interconnected with one another, as well as with a server 206 in a managed service provider data center 286, via a public internet 290. As discussed herein, remote office locations housing a virtual controller are referred to as head-office locations, while remote office locations housing a virtual forwarding switch (but not a virtual network controller) are referred to as branch-office locations.

Figure 3:
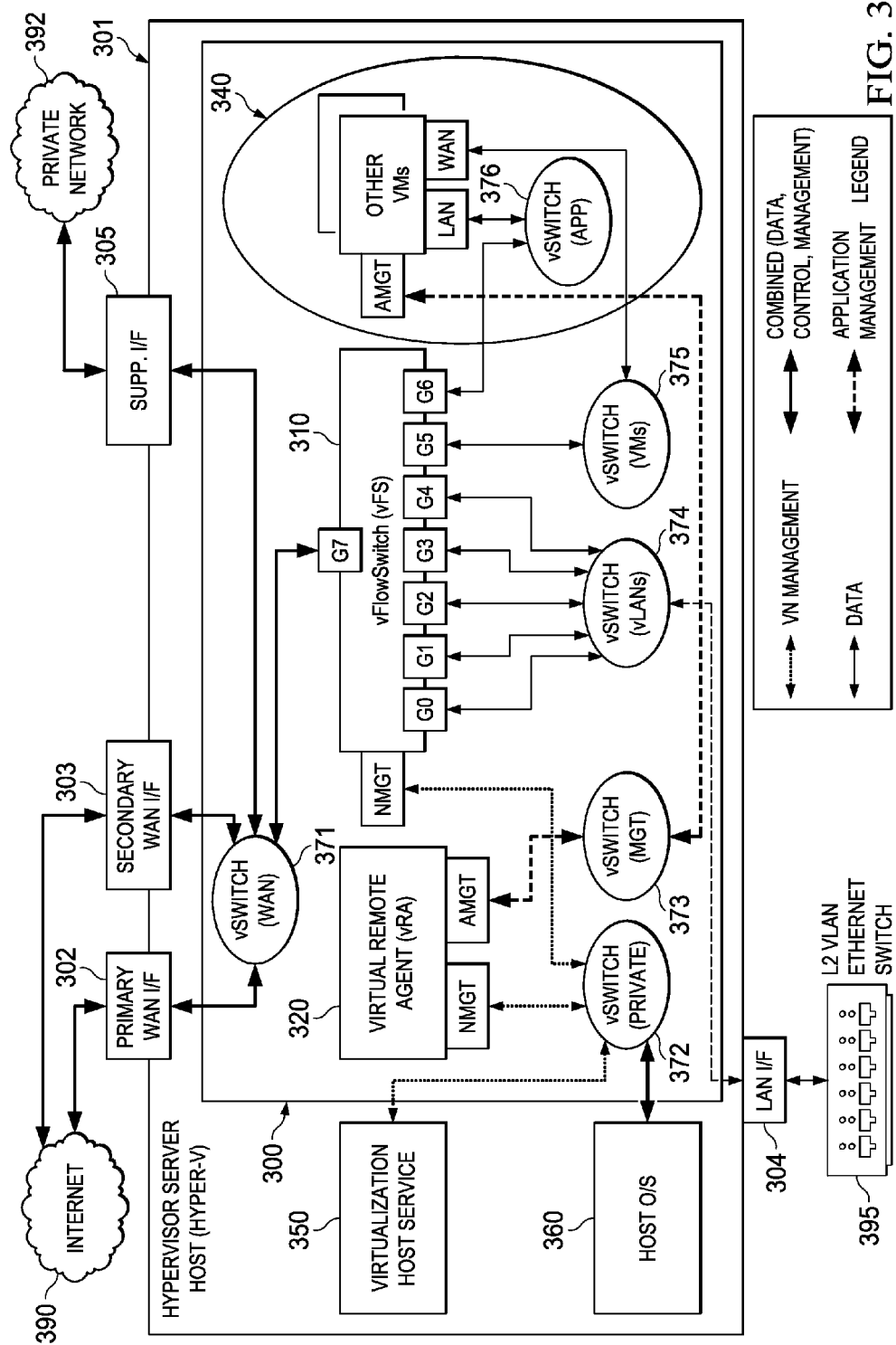
FIG. 3 illustrates a diagram of an embodiment virtual architecture for a distributed host device.

Embodiments of this disclosure provide virtual architectures for distributed host devices. FIG. 3 illustrates an embodiment virtual architecture 300 for a distributed host device 301 positioned in a branch office of a SMB client. As shown, the host device 301 includes a primary WAN interface 302 and a secondary WAN interface 303 configured to communicate over the internet 390, a LAN interface 304 configured to communicate with internal destinations via a virtual LAN (VLAN) Ethernet switch 395, and a supplemental interface 305 configured to communicate over a private network, e.g., a multi-protocol label switching (MPLS) network 392, etc. The host device 301 includes a virtual flow switch 310, a virtual remote agent 320, a plurality of virtual machines 340, and a virtualization host service 350, which are collectively referred to as virtual components 310-350. The virtual components 310-350 and a host operating system 360 are interconnected via links and virtual switches 371-376. These links are classified as combined links, data links, virtual network (VN) management links, and application management links, as indicated by the legend. Other link classifications may also be included in the virtual architecture 300.

Figure 4:
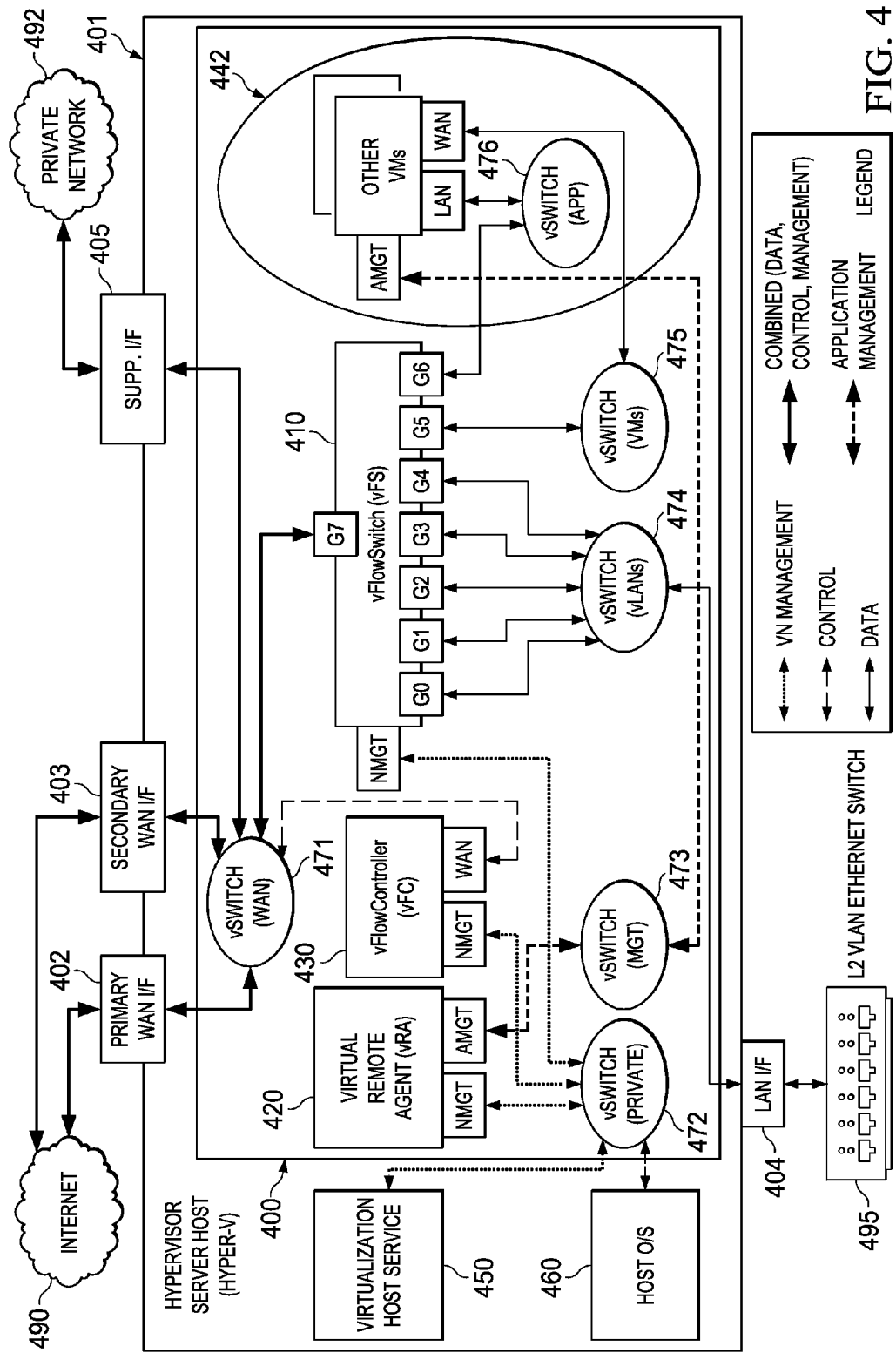
FIG. 4 illustrates a diagram of another embodiment virtual architecture for a distributed host device.

FIG. 4 illustrates an embodiment virtual architecture 400 for a distributed host device 401 positioned in a head office of an SMB client. As shown, the host device 401 includes a primary WAN interface 402 and a secondary WAN interface 403 configured to communicate over the internet 490, a LAN interface 404 configured to communicate with internal destinations via a virtual LAN (VLAN) Ethernet switch 495, and a supplemental interface 405 configured to communicate over a private network 492, e.g., a multi-protocol label switching (MPLS) network, etc. The host device 401 includes a virtual flow switch 410, a virtual remote agent 420, a virtual controller 430, a plurality of virtual machines 440, and a virtualization host service 450, which are collectively referred to as virtual components 410-450. The virtual components 410-450 and a host operating system 460 are interconnected via links and virtual switches 471-476. The links interconnecting the virtual components 410-460 and the host operating system 460 are classified as combined links, data links, control links, VN management links, and application management links, as indicated by the legend. Other link classifications may also be included in the virtual architecture 400.

The combined data links in the virtual architectures 300, 400 may include each of the other link classifications. For example, the combined data links in the virtual architectures 300, 400 may include a multiplexed combination of data links, control links, virtual network (VN) management links, and application management links. The data links may carry data in the virtual edge network. The data may include incoming data communicated from an external source (e.g., from the internet 390, 490) to an internal destination (e.g., device connected to Ethernet switch 395, 495), as well as outgoing data communicated from an internal source to an external destination. The data may also include internal data communicated from an internal source to an internal destination. The control links may carry control signaling in the virtual edge network. Control signaling may include signaling communicated from the virtual controller 430 to other virtual machines in the virtual edge network, e.g., the virtual flow switches 310, 410, etc., and vice-versa. The VN management links and application management links may carry management signaling in the virtual edge network. Management signaling may include signaling communicated from a virtual commander to one of the virtual remote agents 320, 420, as well as signaling instructions communicated from the virtual remote agents 320, 420 to other virtual machines in the virtual edge network.

Figure 5:
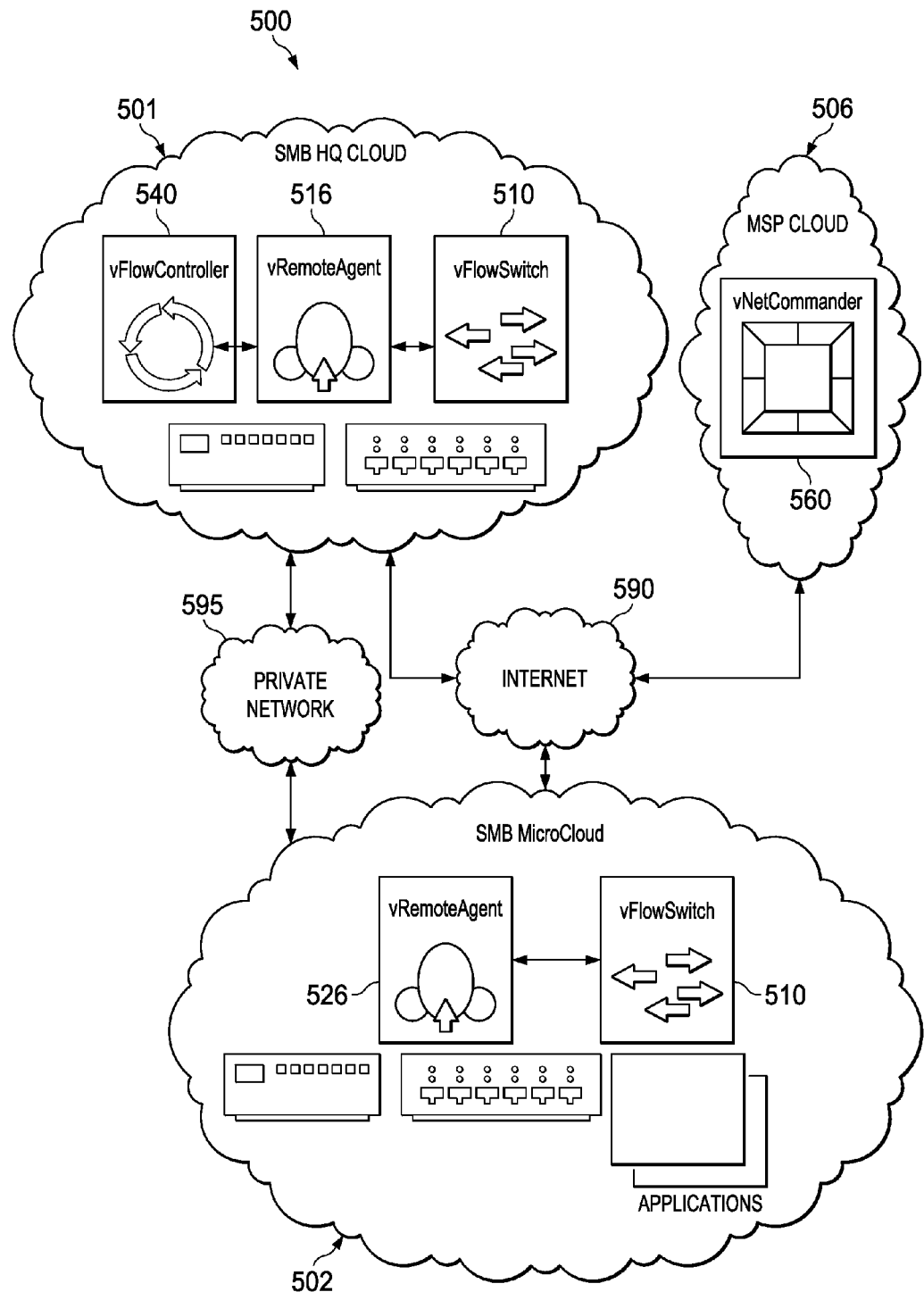
FIG. 5 illustrates a diagram of a virtual edge router embodied in a cloud computing network architecture.

The virtual edge routers provided herein can be embodied in a cloud computing network architecture. FIG. 5 illustrates a virtual edge router 500 embodied in a cloud computing network architecture. As shown, the virtual edge router 500 comprises an SMB headquarter cloud 501, an SMB Micro-Cloud 502, and an MSP cloud 506. The SMB HQ cloud 501 includes a virtual flow switch 510, a virtual remote agent 516, and a virtual flow controller 540. The virtual flow switch 510, the virtual remote agent 516, and the virtual flow controller 540 may be instantiated on the same host device. Alternatively, the virtual flow switch 510, the virtual remote agent 516, and/or the virtual flow controller 540 may be instantiated on different host devices communicating via a local area network of the SMB HQ cloud 501. The SMB MicroCloud 502 includes a virtual flow switch 520 and a virtual remote agent 526. The virtual flow switch 520 and the virtual remote agent 526 may be instantiated on the same or different host devices within the SMB MicroCloud 502. The MSP cloud 506 includes a virtual network commander 560 instantiated on an MSP server. Components within the SMB headquarter cloud 501, the SMB MicroCloud 502, and the MSP cloud 506 may communicate via a public internet 590. In some embodiments, components within the SMB headquarter cloud 501 and the SMB MicroCloud 502 may communicate over a private network 595.

Figure 6:
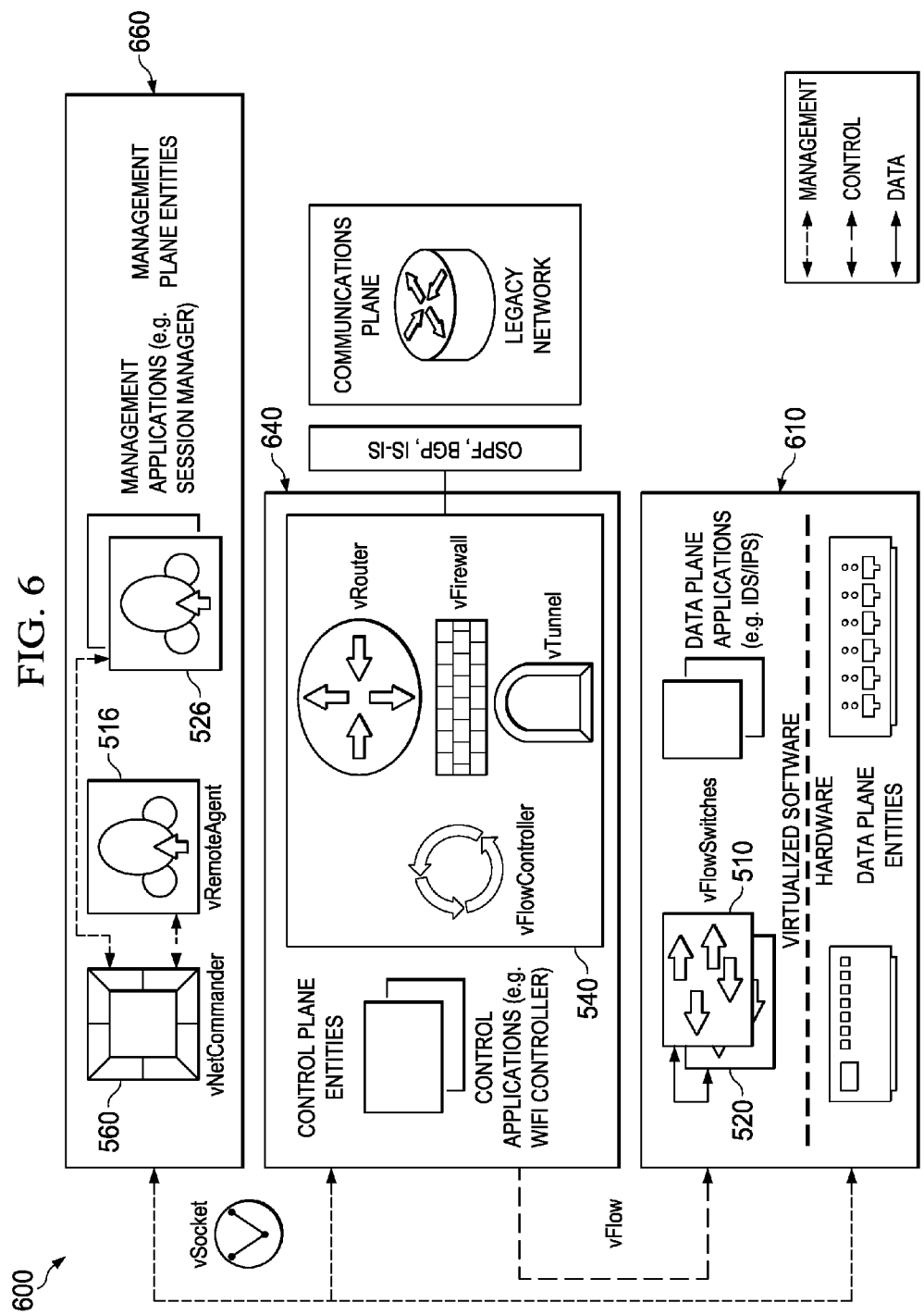
FIG. 6 illustrates a diagram depicting abstracted communications planes in a virtual edge router architecture.

The management and control planes may be abstracted from the data plane in embodiment virtual edge routers architectures. FIG. 6 illustrates a diagram depicting abstracted communications planes 600 in the virtual edge router architecture 500. As shown, the abstracted communications planes 600 include a data plane, a control plane, and a management plane. The management plane interconnects management plane entities 640 to one another, as well as connecting management plane entities 640 to both control plane entities 670 and data plane entities. The control plane interconnects control plane entities 640 to data plane entities 610, while the data plane interconnects data plane entities 610 to one another. Management plane entities 660 include the virtual network commander 560, the virtual remote agents 516, 526, and management applications, e.g., a session manager, etc. Control plane entities 640 include the virtual controller 540 as well as control plan applications, while the data plane entities include the virtual flow switches 510, 520 as well as data plane applications. As shown in FIG. 6, each of the data plane, the control plane, and the management plane have a distinct communication plane topology.

Figure 7:
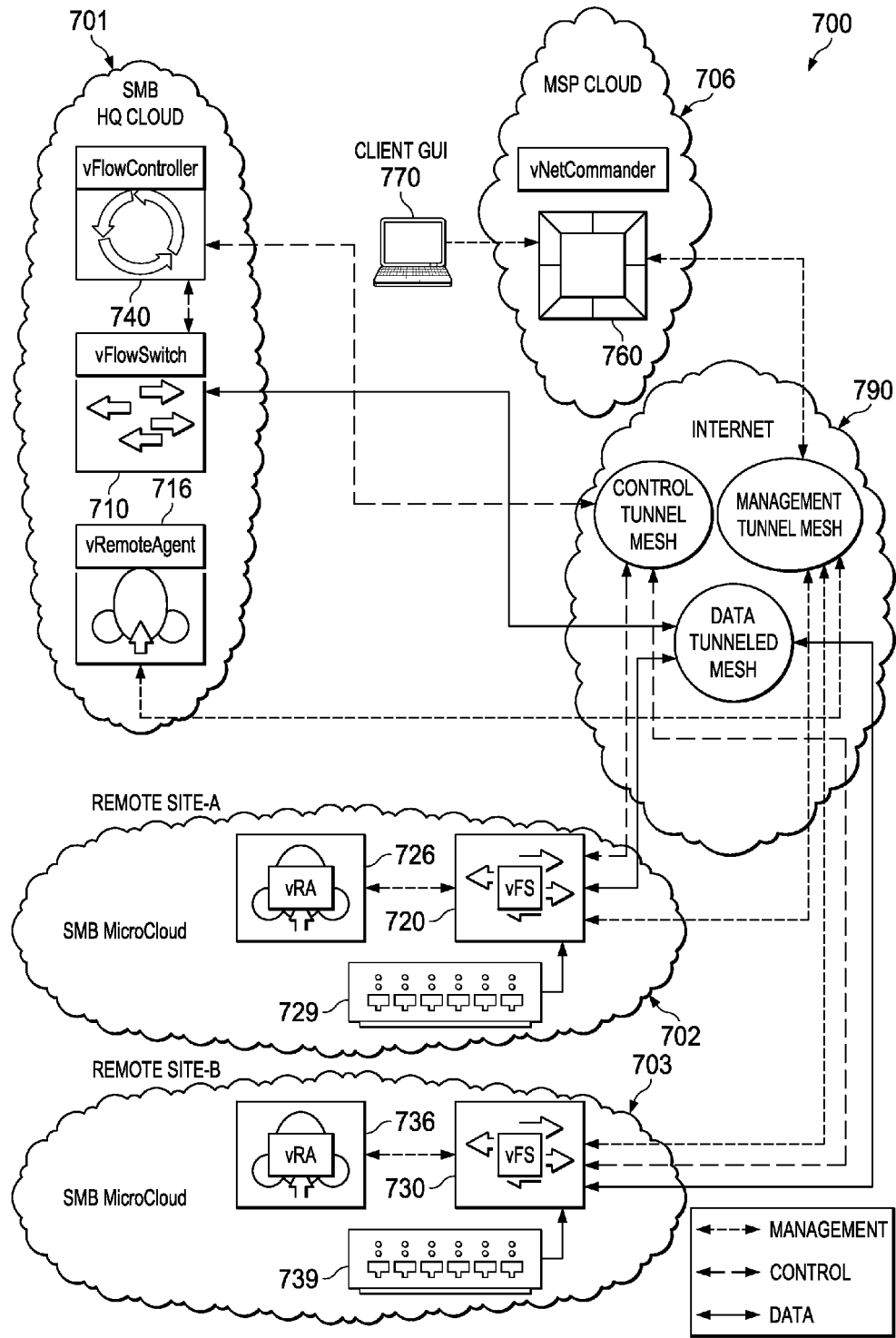
FIG. 7 illustrates a diagram depicting abstracted communications planes of a virtual edge router embodied in a cloud computing network architecture.

FIG. 7 illustrates communications planes of a virtual edge router embodied in a cloud computing network architecture 700. As shown, the cloud computing network architecture 700 comprises an SMB headquarter cloud 701, an SMB MicroClouds 702, 703 and an MSP cloud 706. The SMB HQ cloud 701 includes a virtual flow switch 710, a virtual remote agent 716, and a virtual flow controller 740. The virtual flow switch 710, the virtual remote agent 716, and the virtual flow controller 740 may be virtual machines instantiated on the same host device, or on different host devices communicating via a local area network of the SMB HQ cloud 701. The SMB MicroCloud 702 includes a virtual flow switch 720 and a virtual remote agent 726. The virtual flow switch 720 and the virtual remote agent 726 may be virtual machines instantiated on the same host device, or on different host devices communicating via a local area network of the SMB MicroCloud 702. The SMB MicroCloud 703 includes a virtual flow switch 730 and a virtual remote agent 736, which may be virtual machines instantiated on the same host device, or on different host devices communicating via a local area network of the SMB MicroCloud 703. The MSP cloud 706 includes a virtual net commander 760, which may correspond to a management controller on a server. Components within the SMB headquarter cloud 701, the SMB MicroClouds 702, 703 and the MSP cloud 706 may communicate via a public internet 790. In an embodiment, a client graphical user interface (GUI) 770 may interact with the virtual network commander 760 to configure/re-configure components of the virtual edge router.

Figure 8:
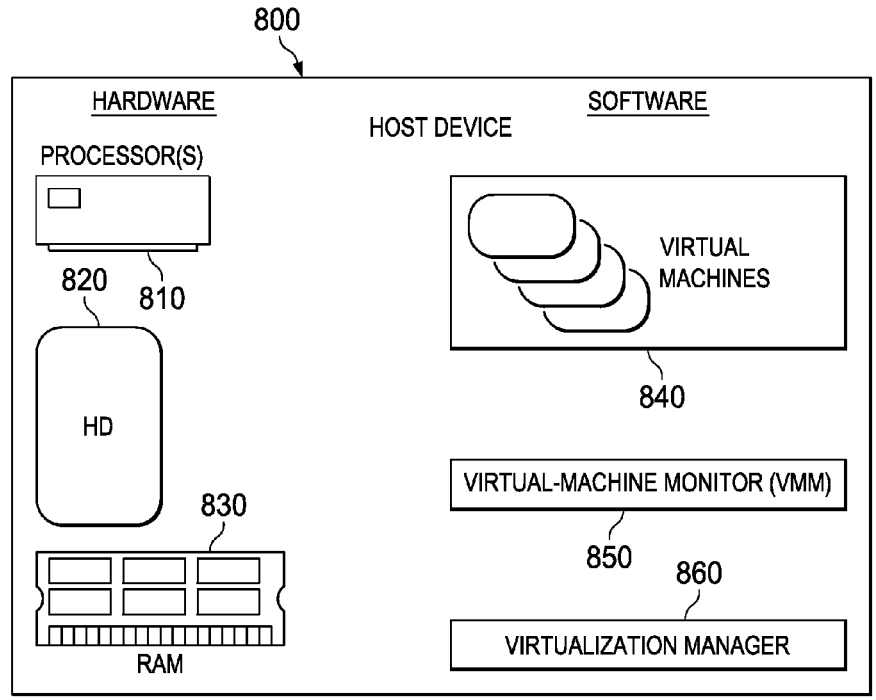
FIG. 8 illustrates a diagram of an embodiment distributed host device.

FIG. 8 illustrates an embodiment host device 800 configured to be deployed in a virtual edge routing network. As shown, the embodiment host device 800 comprises hardware that includes one or more processors 810, a hard drive 820, and random access memory 830, as well as software that includes virtual machines 850, a virtual machine monitor 840, and a virtualization manager 860. The processors 810 may include any hardware components configured to execute programming instructions. In an embodiment, the processors 810 are configured to perform parallel processing, e.g., massively parallel processing (MPP). The hard drive 820 may include any hardware components configured to permanently or statically store digital information. In an embodiment, the hard drive 820 is a solid state drive (SSD). The random access memory 830 may include any hardware components configured to temporarily or dynamically store digital information. The virtual machines 840 may be software-based emulations of machines (e.g., computers) configured to execute programs. The virtual machine monitor 850 may include any component configured to create and run the virtual machines 840, and the virtualization manager 860 may be any component configured to manage the virtual machines 840. While typically embodied as software, the virtual machine monitor 850 and the virtualization manager 860 may include firmware and/or hardware in some implementations.

Figure 9:
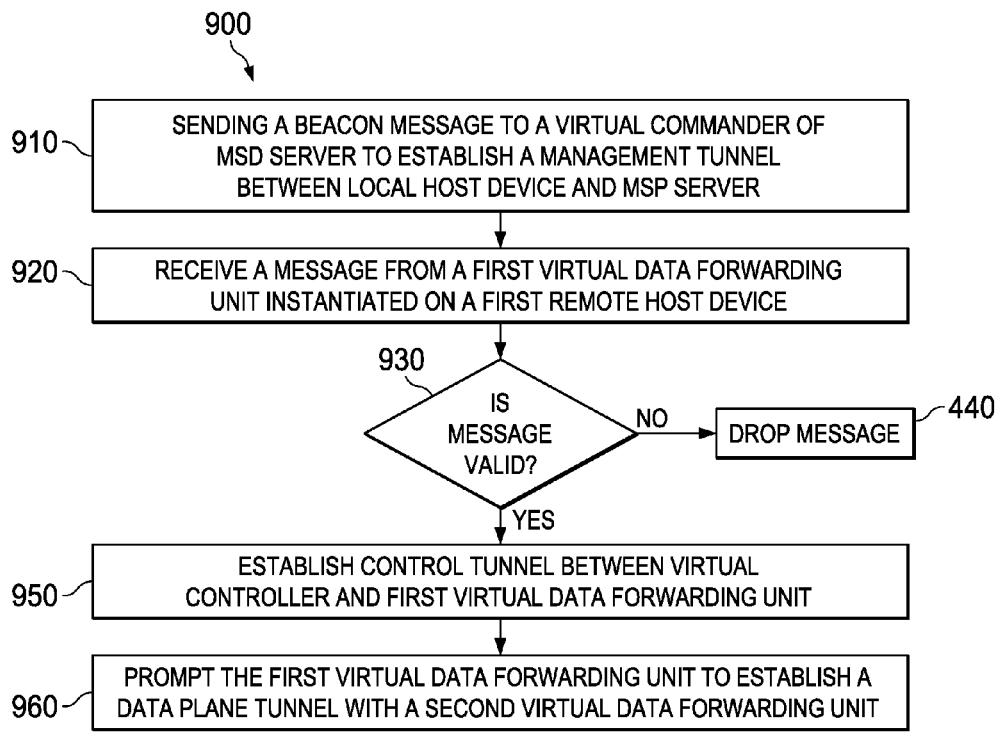
FIG. 9 illustrates a flowchart of a method for establishing abstracted communications planes in a virtual edge router network.

Aspects of this disclosure provide methods for establishing communications planes of a virtual edge router. FIG. 9 illustrates a method 900 for establishing abstracted communications planes in a virtual edge router, as might be performed by a local host device housing a virtual network controller. Within the context of FIG. 9, steps performed by the "local host device" may include any step performed by a virtual machine (or component) of the local host device. As shown, the method 900 begins at step 910, where the local host device sends a beacon message to a virtual network commander on an MSP server. The beacon is configured to prompt the virtual network commander to establish a management tunnel between the MSP server and the local host device. Next, the method 900 proceeds to step 920, where the local host device receives a message from a first virtual data forwarding unit instantiated on a first remote host device. The message may be a control tunnel establishment message configured in accordance with management signaling communicated to the first remote host device from the virtual network commander during initial power-up of the remote host device. For example, the control tunnel establishment message may be encrypted in accordance with a control tunnel password (e.g., private or public key) carried by the management signaling. Moreover, the control tunnel establishment message may be addressed to an IP address (e.g., IP address of local host device) carried by the management signaling. Next, the method 900 proceeds to step 930, where a network controller determines whether the message is valid. If not, the message is dropped at step 940. If the message is valid, then the method 900 proceeds to step 950, where the virtual controller establishes a control tunnel between the virtual controller and the first virtual data forwarding unit. Thereafter, the method 900 proceeds to step 960, where the virtual controller prompts the first virtual data forwarding unit to establish a data plane tunnel with a second virtual data forwarding unit. Additional details concerning the establishment of management, control, and data tunnels of virtual edge routers are provided by U.S. Patent Application [Atty. Dock. No. NET-008].

Figure 10:
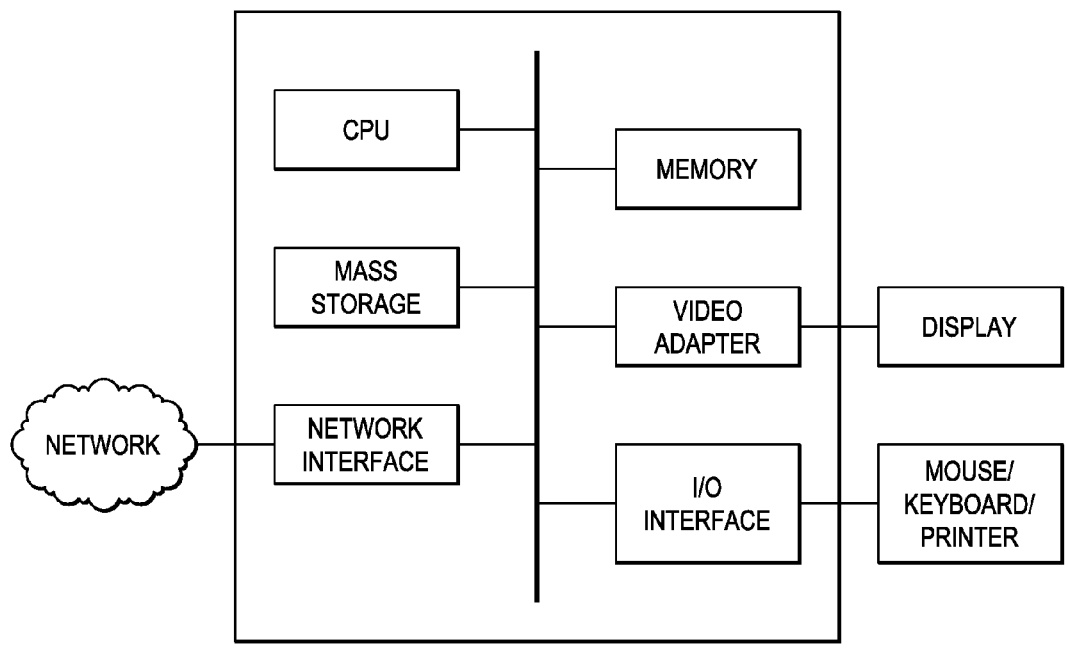
FIG. 10 illustrates a diagram of an embodiment computing platform.

FIG. 10 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
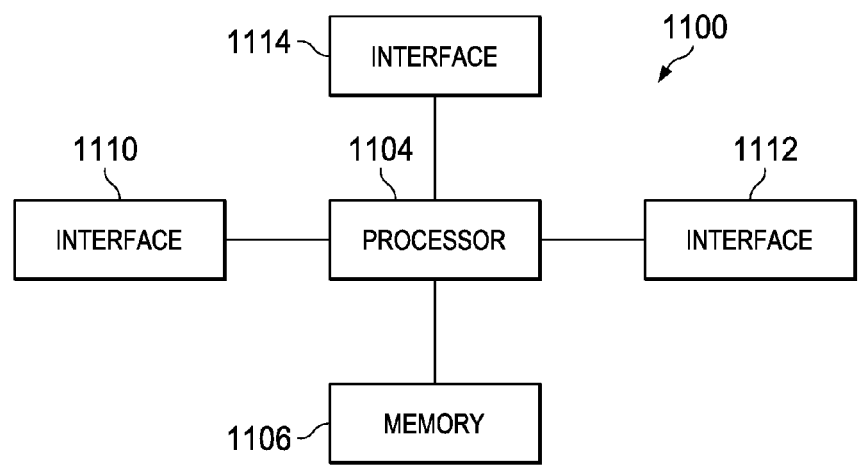
FIG. 11 illustrates a diagram of an embodiment communications device.

FIG. 11 illustrates a block diagram of an embodiment of a communications device 1100, which may be equivalent to one or more devices discussed above. The communications device 1100 may include a processor 1104, a memory 1106, and a plurality of interfaces 1110, 1112, 1114, which may (or may not) be arranged as shown in FIG. 11. The processor 1104 may be any component capable of performing computations and/or other processing related tasks, and the memory 1106 may be any component capable of storing programming and/or instructions for the processor 1104. The interfaces 1110, 1112, 1114 may be any component or collection of components that allows the communications device 1100 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A virtual edge router comprising:
a plurality of virtual data forwarding units, wherein each virtual forwarding unit is instantiated on a different one of a plurality of host devices;
a data plane communicatively coupling the plurality of virtual data forwarding units with one another, wherein the data plane includes data tunnels extending between WAN interfaces of the host devices;
a virtual controller instantiated on a central host device; and
a control plane communicatively coupling the virtual controller to each of the virtual data forwarding units, wherein the control plane includes control tunnels interconnecting a WAN interface of the central host device to WAN interfaces of the plurality of host devices, and
wherein the virtual controller establishes the control tunnels by decrypting encrypted control tunnel establishment messages, received from the plurality of virtual data forwarding units, in accordance with a control tunnel password.

2. The virtual edge router of claim 1, further comprising:
a plurality of virtual remote agents instantiated on the central host device and on the plurality of host devices, wherein each virtual remote agent is instantiated on a different host device; and
a management plane interconnecting the plurality of virtual remote agents to a virtual network commander in a server, wherein the management plane includes management tunnels interconnecting WAN interfaces of the central host device and the plurality of host devices to the server.

3. The virtual edge router of claim 2, wherein each of the data plane, the control plane, and the management plane have a distinct communication plane topology.

4. The virtual edge router of claim 1, wherein the plurality of virtual data forwarding units includes at least a first virtual data forwarding unit instantiated on a first host device and a second virtual data forwarding unit instantiated on a second host device, and
   wherein the data plane of the virtual edge router includes a data tunnel interconnecting a WAN interface of the first host device with a WAN interface of the second host device.

5. The virtual edge router of claim 4, wherein the data tunnel is established at least partially over a wide area network.

6. The virtual edge router of claim 5, wherein the first host device comprises at least a first local area network (LAN) interface and the second host device comprises at least a second LAN interface, the first LAN interface and the second LAN interfaces being LAN interfaces of the virtual edge router.

7. The virtual edge router of claim 6, wherein the first virtual forwarding unit is configured to receive a data packet addressed to the second LAN interface over the first LAN interface, and to forward the data packet over the data tunnel to the second virtual forwarding unit.

8. The virtual edge router of claim 7, wherein the forwarded data packet is communicated over the wide area network without exiting the data plane of the virtual edge router.

9. The virtual edge router of claim 4, wherein the control plane includes a control tunnel interconnecting the WAN interface of the central host device to the WAN interface of the second host device.

10. The virtual edge router of claim 9, wherein the virtual controller is configured to update and manage a routing table in the second virtual data forwarding unit via control signaling communicated over the control tunnel.

11. The virtual edge router of claim 9, wherein the first host device and the central host device are the same host device, and wherein the virtual controller and the first virtual data forwarding unit are co-located on the same host device.

12. The virtual edge router of claim 9, wherein the central host device excludes the plurality of virtual data forwarding units.

13. A local host device comprising a wide area network (WAN) interface, a processor, and a memory adapted to store programming for execution by the processor, the programming including instructions to:
   send a beacon message to a virtual network commander instantiated on a server, the beacon message configured to establish a management tunnel between the WAN interface of the local host device and the virtual network commander on the server, wherein the management tunnel is adapted to carry signaling over a management plane of a virtual edge router;
   trigger establishment of a control tunnel between the WAN interface of the local host device and a WAN interface of a first remote host device, wherein the control tunnel is adapted to carry signaling over a control plane of the virtual edge router, and wherein the instructions to trigger establishment of the control tunnel includes instructions to receive an encrypted control tunnel establishment message from a first virtual data forwarding unit instantiated on the first remote host device, to attempt to decrypt the encrypted control tunnel establishment message in accordance with a control tunnel password, and to establish the control tunnel when attempt to decrypt the encrypted control tunnel establishment message is successful; and
   trigger establishment of a data tunnel adapted to carry signaling over a data plane of the virtual edge router, wherein each of the data plane, the control plane, and the management plane have a distinct communication plane topology.

14. The local host device of claim 13, further comprising a virtual controller instantiated on the local host device, wherein the virtual controller is configured to communicate control signaling over the control tunnel to the first virtual data forwarding unit instantiated on the first remote host device.

15. The local host device of claim 13, wherein the programming further includes instructions to receive the control tunnel password over the management plane of the virtual edge router.

16. The local host device of claim 14, wherein the instructions to trigger establishment of the data tunnel includes instructions to:
   forward a routing table over the control tunnel to the first virtual data forwarding unit instantiated on the first remote device, the routing table specifying an address of a second remote host device, and wherein the routing table prompts the first virtual data forwarding unit to send a data tunnel establishment message to a second virtual data forwarding unit instantiated on the second remote host device, the data tunnel establishment message configured to establish the data tunnel between the WAN interface of the first remote host device and a WAN interface of the second remote host device.

17. The local host device of claim 13, wherein the data tunnel extends between the WAN interface of the local host device and the WAN interface of the first remote host device, and
   wherein the first virtual data forwarding unit is configured to communicate data signaling over the data tunnel to a second virtual data forwarding unit instantiated on the first remote host device.

18. The local host device of claim 17, wherein the data tunnel extends at least partially over a wide area network, and wherein the first virtual data forwarding unit is configured to exchange data packets with the second virtual data forwarding unit over the data tunnel, the forwarded data packets being transported over the wide area network without exiting the data plane of the virtual edge router.

19. A local host device comprising a wide area network (WAN) interface, a processor, and a memory adapted to store programming for execution by the processor, the programming including instructions to:
   send a beacon message to a virtual network commander instantiated on a server, the beacon message configured to establish a management tunnel between the WAN interface of the local host device and the virtual network commander on the server, wherein the management tunnel is adapted to carry signaling over a management plane of a virtual edge router;
   trigger establishment of a control tunnel between the WAN interface of the local host device and a WAN interface of a first remote host device, wherein the control tunnel is adapted to carry signaling over a control plane of the virtual edge router, wherein the instructions to trigger establishment of the control tunnel includes instructions to receive a configuration instruction carrying a control tunnel password and an internet protocol (IP) address of the first remote host device over the management tunnel from the virtual network commander, to encrypt a control tunnel establishment message in accordance with the control tunnel password, and to send the encrypted control tunnel establishment message to a virtual network controller instantiated on the first remote host device, the encrypted control tunnel establishment message configured to establish the control tunnel; and trigger establishment of a data tunnel adapted to carry signaling over a data plane of the virtual edge router, wherein each of the data plane, the control plane, and the management plane have a distinct communication plane topology.

20. The local host device of claim 19, wherein the instructions to trigger establishment of the data tunnel include instructions to:

receive a routing table from the virtual network controller over the control tunnel, the routing table specifying an address of a second remote host device; and send a data tunnel establishment message to a second virtual data forwarding unit instantiated on the second remote host device, wherein the data tunnel establishment message is configured to establish the data tunnel between the WAN interface of the first remote host device and a WAN interface of the second remote host device.

21. The local host device of claim 13, further comprising a virtual remote agent instantiated on the local host device, wherein the management plane interconnects the virtual remote agent to the virtual network commander on the server.

22. The local host device of claim 19, wherein the data tunnel is established at least partially over a wide area network.

* * * * *